United States Patent
Lenz

(10) Patent No.: US 7,347,509 B2
(45) Date of Patent: Mar. 25, 2008

(54) DIAPHRAGM-TYPE ACCUMULATOR

(75) Inventor: René Lenz, Frankfurt am Main (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 164 days.

(21) Appl. No.: 11/273,684

(22) Filed: Nov. 14, 2005

(65) Prior Publication Data

US 2006/0103233 A1    May 18, 2006

(30) Foreign Application Priority Data

Jan. 19, 2005    (DE) ............... 10 2005 002 433

(51) Int. Cl.
*B60T 17/04* (2006.01)
(52) U.S. Cl. ................ 303/87; 303/DIG. 11
(58) Field of Classification Search ........... 303/87, 303/DIG. 11; 138/30, 31, 26
See application file for complete search history.

(56) References Cited

U.S. PATENT DOCUMENTS

| | | | | |
|---|---|---|---|---|
| 5,265,943 A | * | 11/1993 | Kehl et al. ........... | 303/87 |
| 6,092,552 A | * | 7/2000 | Takamatsu et al. ....... | 138/30 |
| 6,182,637 B1 | * | 2/2001 | Kilgore et al. ........ | 123/467 |
| 6,230,685 B1 | * | 5/2001 | Kilgore et al. ........ | 123/467 |
| 6,848,755 B2 | * | 2/2005 | Yuda et al. ........... | 303/87 |
| 2003/0209940 A1 | * | 11/2003 | Inage et al. .......... | 303/87 |

FOREIGN PATENT DOCUMENTS

| | | |
|---|---|---|
| DE | 3329169 | 2/1985 |
| DE | 3925874 | 2/1991 |
| DE | 4141929 | 6/1993 |
| DE | 19753308 | 6/1999 |
| DE | 10008227 | 8/2001 |
| EP | 0482916 | 4/1992 |

* cited by examiner

*Primary Examiner*—Melanie Torres

(57) ABSTRACT

A diaphragm-type accumulator for a slip-controlled vehicle brake system has a media-separating element in a housing bore including a diaphragm made of an elastic material, which has a concave design with respect to a pressure fluid inlet for the purpose of pressure fluid intake.

The diaphragm is acted upon indirectly by an accumulator spring, with a diaphragm plate interposed, and wherein the diaphragm plate has a concave design with respect to the pressure fluid inlet.

9 Claims, 2 Drawing Sheets

DIAPHRAGM-TYPE ACCUMULATOR

BACKGROUND OF THE INVENTION

The present invention relates to a diaphragm-type accumulator for a slip-controlled vehicle brake system which is typically arranged in a hydraulic connection between a wheel brake and a hydraulic pump.

Low-pressure accumulators of the piston type are used in brake systems of large-series production which principally satisfy the related requirements. An accumulator system of the above-mentioned type of construction is disclosed in DE 41 41 929 A1 as an example.

EP 0 482 916 A1 discloses a diaphragm-type accumulator which comprises a one-part, thin-walled and plastically deformed housing having a compartment disposed between the diaphragm and the housing that includes a separately mounted pressure fluid connection. On the opposite side of the diaphragm, there is a filling port in the housing with the aim of supplying another compartment disposed between the diaphragm and the housing with a constant accumulator pressure that defines the pressure and volume characteristics of the diaphragm-type accumulator. The diaphragm-type accumulator disclosed is exclusively designed for being employed as a high-pressure accumulator.

DE 197 53 308 A1 discloses a low-pressure diaphragm-type accumulator for use in a vehicle brake system. The diaphragm has a concave design in such a fashion that it automatically performs a resetting movement into an inactive position after its excursion.

An object of the invention is to provide a simple, low-cost and yet functionally reliable diaphragm-type accumulator which can be used for the low-pressure range in a vehicle brake system. The special objective is to allow that volume intake in the low-pressure accumulator takes place even at very low locking pressures in order to take into account particularly the situation existing on low-coefficient-of-friction conditions or in two-wheel brake systems.

SUMMARY OF THE INVENTION

According to the invention, this object is achieved for a diaphragm-type accumulator of the indicated type in that the diaphragm is acted upon indirectly by an accumulator spring, with a diaphragm plate interposed, and in that the diaphragm plate has a concave design with respect to the pressure fluid inlet and/or pressure fluid outlet.

According to the invention, the two functions are separated so that the diaphragm is freed from resetting functions and can be optimized for the function of separation of media to a virtually full extent. The resetting function is fulfilled by an accumulator spring, and the stability of the diaphragm is supported by a diaphragm plate.

Further features, advantages, and possible applications of the invention can be taken in the following from the description of an embodiment.

DETAILED DESCRIPTION OF THE DRAWINGS

Figure 1:
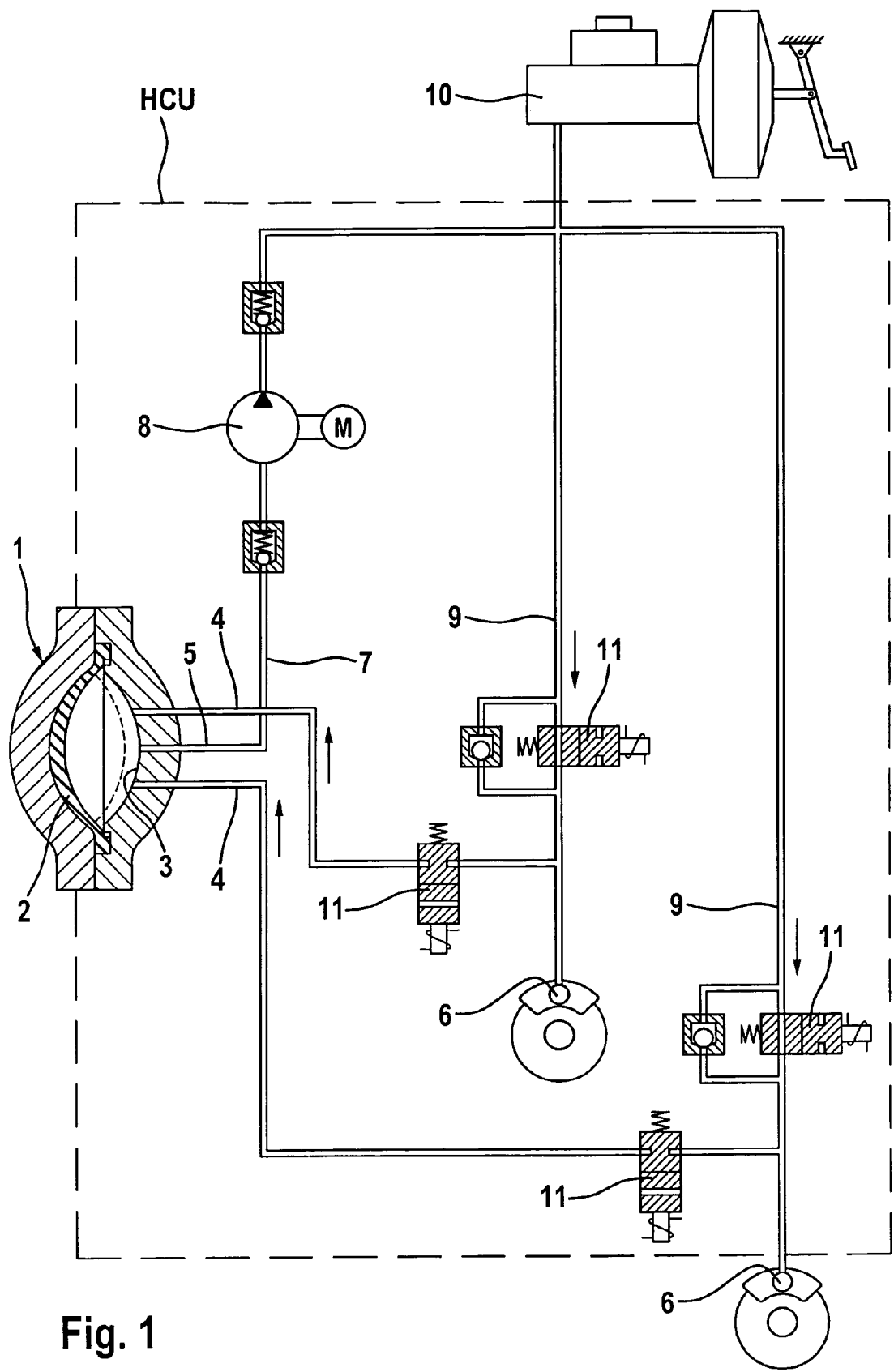
FIG. 1 is a schematic hydraulic circuit diagram for illustrating the basic relations in a slip-controlled vehicle brake system.

FIG. 1 illustrates the relationship between a hydraulic circuitry and function of a slip-controlled motor vehicle brake system by way of the example of one single brake circuit comprising two wheel brakes 6, including a block-shaped hydraulic unit (HCU) comprising electrohydraulic components such as valves, ducts, and a diaphragm accumulator 1, which is integrated in the hydraulic unit, and comprising a diaphragm 2 as a media-separating element, with the diaphragm 2 being provided in a housing bore 3 of the hydraulic unit HCU, and with pressure fluid inlet 4 and pressure fluid outlet 5 provided in the hydraulic unit in the direction of the diaphragm 2. The pressure fluid inlet 4 is connected to wheel brakes 6 and, on the other hand, is connected to a suction path of a motor-driven pump 8 by way of a pressure fluid channel 7. Pump 8 opens with a pump pressure side into a brake conduit 9 connecting the wheel brakes 6 to a brake pressure generator 10. Both in the brake conduit 9 and in the pressure fluid channel 7, pressure control valves 11 (one inlet valve and one outlet valve in each case) are disposed in pairs and control the phases of pressure buildup, pressure maintenance and pressure reduction in each wheel brake 6. In the embodiment shown, the diaphragm-type accumulator 1 is filled with pressure fluid which can be aspirated by the pump 9 by way of a non-return valve (suction valve). The resetting force of an accumulator spring in connection with the reduction of the pressure fluid volume in the diaphragm-type accumulator 1 during pump operation causes a resetting movement into an inactive position without excursion, as can be seen in FIG. 2.

Figure 2:
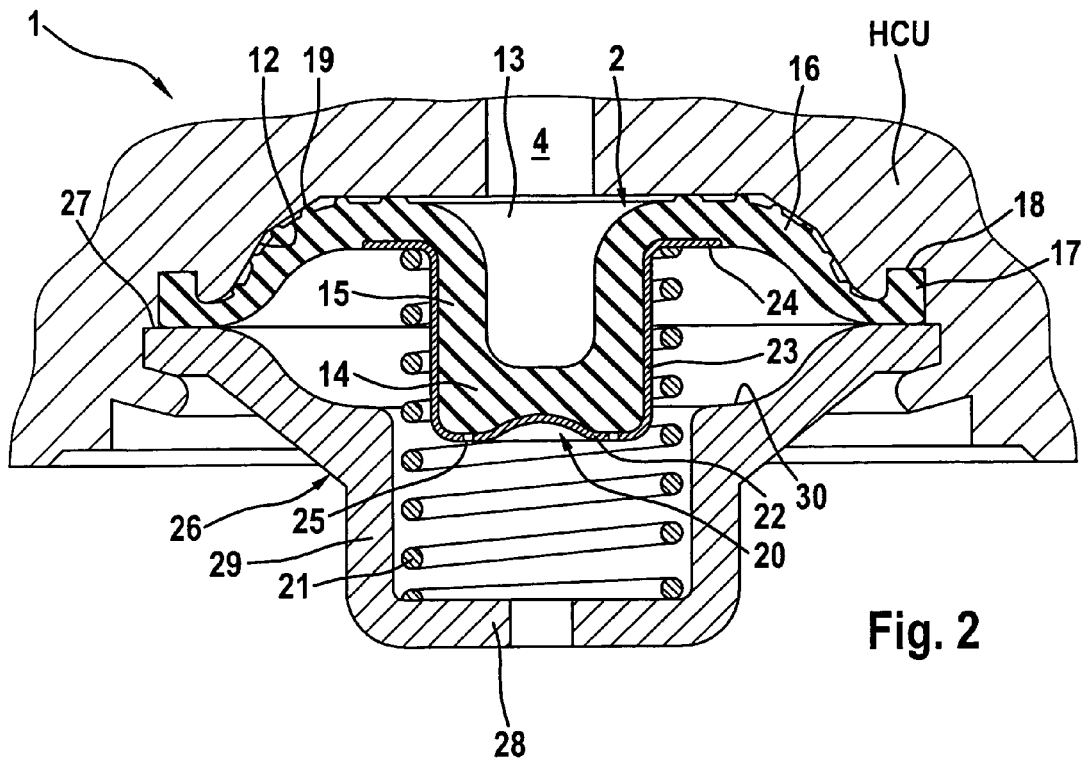
FIGS. 2 and 3 show enlarged cross-sectional views of an embodiment of a diaphragm-type accumulator, in the unfilled and the filled condition, respectively.

FIG. 2 will be dealt with more closely in the following. The block-shaped hydraulic unit (HCU) forms a basic housing part for accommodating the diaphragm-type accumulator 1 and comprises a stepped bore 12 for forming a compartment 13 that can be filled with pressure fluid and, along with the diaphragm 2 made of elastic material, delimits the compartment 13 that can be filled with pressure fluid. With respect to a combined pressure fluid inlet and pressure fluid outlet 4, the diaphragm 2 is concavely designed with a bottom 14, a wall 15 and an edge 16, said edge 16 including a peripheral bead 17 being compressed into a groove 18 of the stepped bore 12.

Naturally, the diaphragm 2 is exposed to major stress. A rupture in the diaphragm would cause leakiness in the brake system and allow contamination with water or air. In view of this background, great care is taken to ensure diaphragm contours and diaphragm cross-sections withstanding stress and providing fatigue strength, as can easily be seen in FIG. 2. Besides, it becomes obvious from the drawing that rugged transitions or edges on the side of the diaphragm are consequently avoided to prevent the diaphragm from damages.

On the wetted side, the diaphragm 2 is apparently furnished with protrusions such as ribs 19, knubs or similar surface structures in order to prevent sucking or gluing on a housing wall. Further, the diaphragm contour is suitably conformed to the contour of the stepped bore 12 in order to safeguard a maximum possible even tension course by means of a maximum possible even abutment of the diaphragm 2 on the stepped bore 12. Principally the same applies to the configuration of the diaphragm 2 on the side of the diaphragm plate.

On the side remote from the compartment 13 that can be filled with pressure fluid, the diaphragm 2 is acted upon indirectly through a diaphragm plate 20 by means of an accumulator spring 21 which generates the necessary diaphragm resetting forces. Compared to high-pressure accumulators, the accumulator spring 21 can be designed weakly, that means with a soft spring constant, whereby pressure fluid intake at low locking pressures is enabled.

In conformity with the diaphragm 2, the diaphragm plate 20 is configured like a bowl with a bottom 22, a wall 23, and with an edge 24. The accumulator spring 21 embraces the wall 23 on an outside surface and abuts on the edge 24. As can be seen, the edge 24 abutting at the diaphragm side has the cross-section of a circular ring with a radial extension that is considerably larger than the wire cross-section of the accumulator spring 21 in order to permit a uniform introduction of force at low surface pressures. The bottom 22 of the diaphragm plate 20 has a convex design with respect to the combined pressure fluid inlet and pressure fluid outlet 4, which produces a certain centering effect. Moreover, the diaphragm plate 20 is preferably made of a sheet-metal material in forming processes, with edges being carefully provided with a rounded design. As can further be seen, at least the bottom 22 of the diaphragm plate 20 has through-holes 25 in order that a volume of air which is encased due to the assembly can easily escape from the bowl bottom area in a two-part type of construction of diaphragm plate 20 and diaphragm 2. It is self-explanatory that the through-holes 25 are deburred and that their diameter is so small that the prevailing pressure differences will not draw the elastic diaphragm into the through-holes 25 and damage it. When the diaphragm and diaphragm plate 2, 20 are integrally vulcanized to form a construction unit, the need for through-holes 25 is principally obviated. However, it is also possible that the through-holes 25, if their cross-section is somewhat enlarged, are deliberately penetrated by vulcanized rubber material in order to provide a supplemental form-locking securing mechanism.

Figure 3:
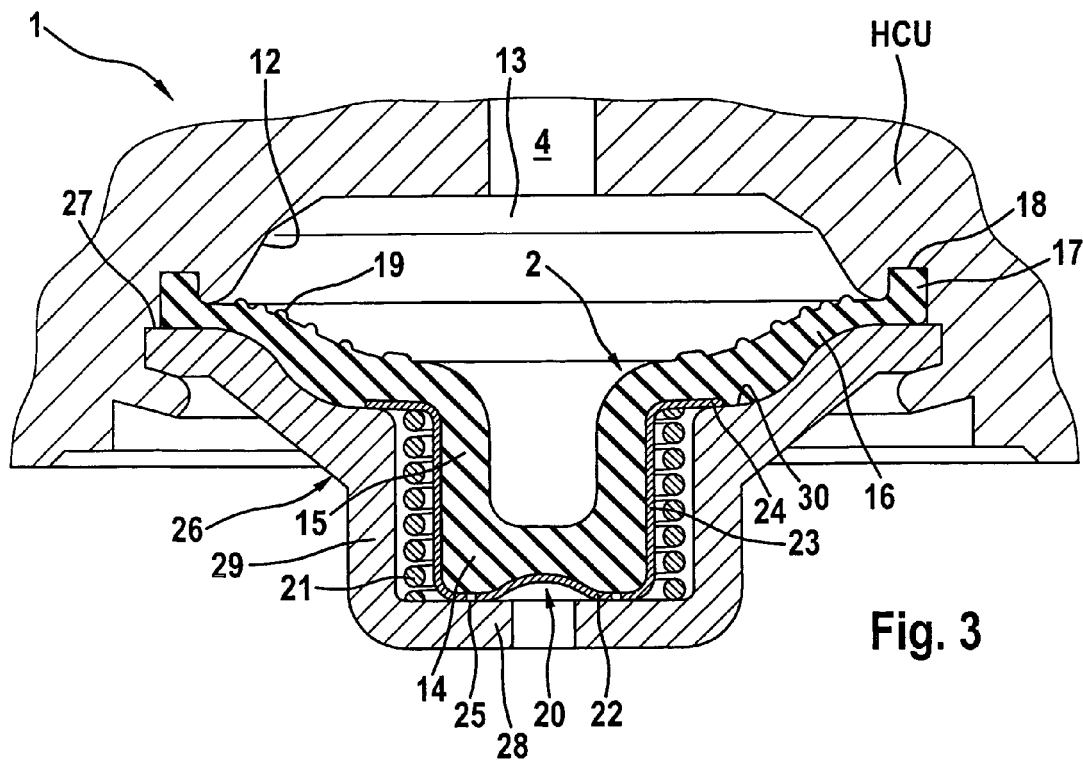

The compartment 13 to which the diaphragm 2 has access is delimited by the stepped bore 12 and a cover 26 which sealingly abuts on the bead 17 and is seated on a bore step 27, and is fastened in this position. Preferably, the cover 26 as shown in FIGS. 2 and 3 is calked or clinched with the material of the hydraulic unit in a high-pressure sealed fashion. As becomes clear from the drawings, the cover 26 is shaped like a bowl with a bottom 28, with a wall 29, and with an edge 30, and the accumulator spring 21 is arranged at least partly within the wall 29.

As is finally shown in FIG. 3, first the edge 24 of the diaphragm plate 20 is movable into abutment on the edge 30 of the cover 26 in order to limit the absorptive volume of the accumulator. A simple stop that is in conformity with practice is formed this way, avoiding damage to the diaphragm due to overload. The adaptation of all dimensions and tolerances between cover 26 and diaphragm plate 20 is preferably chosen such that initially the edge 24 of the diaphragm plate 20 abuts on the cover before the bottom 22 of the diaphragm plate 20 moves into abutment on the bottom 28 of the cover 26. This way a statically and dynamically defined stop systematics is reached, and inadmissibly high extrusions of the elastic diaphragm 2 are reliably avoided. The elastic deformation of the edge 24 due to this stop systematics becomes particularly obvious in a comparison between FIG. 2 and FIG. 3. For example, the dimensions and tolerances are chosen to be such that with a first abutment of the edge 24 on the edge 20, still 1/10 mm approximately remains until the bottom 22 abuts on the cover 26.

LIST OF REFERENCE NUMERALS 1 diaphragm-type accumulator
2 diaphragm
3 housing bore
4 pressure fluid inlet
5 pressure fluid outlet
6 wheel brake(s)
7 pressure fluid channel
8 pump
9 brake conduit
10 brake pressure accumulator
11 pressure control valve(s)
12 stepped bore
13 compartment
14 bottom
15 wall
16 edge
17 bead
18 groove
19 rib
20 diaphragm plate
21 accumulator spring
22 bottom
23 wall
24 edge
25 through-hole
26 cover
27 bore step
28 bottom
29 wall
30 edge

The invention claimed is:

1. A diaphragm-type accumulator for a slip-controlled vehicle brake system which is arranged in a hydraulic connection between a wheel brake (6) and a hydraulic pump (8),
with a housing bore,
an inlet,
an outlet, and
a media-separating element in the housing bore (3) including a diaphragm (2) made of an elastic material for the purpose of pressure fluid intake,
wherein the diaphragm (2) is acted upon indirectly by an accumulator spring (21), with a diaphragm plate (20) interposed, and wherein the diaphragm plate (20) has a concave design with respect to the pressure fluid inlet (4) and
wherein the diaphragm plate (20) is shaped like a bowl with a bottom (22), with a wall (23), and with an edge (24), and wherein the accumulator spring (21) surrounds the wall (23) and abuts on the edge (24).

2. The diaphragm-type accumulator as claimed in claim 1, wherein the bottom (22) has a convex design with respect to the pressure fluid inlet (4).

3. The diaphragm-type accumulator as claimed in claim 1, wherein at least the bottom (22) or the wall (23) includes through-holes (25).

4. The diaphragm-type accumulator as claimed in claim 1, wherein the diaphragm plate (20) is made of sheet metal by means of non-cutting forming processes.

5. The diaphragm-type accumulator as claimed in claim 1, wherein the diaphragm (2) has access to a compartment (13) which is delimited by a stepped bore (12) and by a cover (26), and wherein the cover (26) is supported and fastened on a bore step (27), while abutting on a bead (17).

6. The diaphragm-type accumulator as claimed in claim 5, wherein the cover (26) is shaped like a bowl with a bottom (28), a wall (29), and with an edge (30), and wherein the accumulator spring (21) is at least partly arranged within the wall (29).

7. The diaphragm-type accumulator as claimed in claim 5, wherein the edge (24) of the diaphragm plate (20) is movable into abutment on the edge (30) of the cover (26).

8. The diaphragm-type accumulator as claimed in claim 1, wherein the diaphragm plate (20) is vulcanized integrally with the diaphragm (2).

9. A slip-controlled vehicle brake system comprising
a wheel brake,
a hydraulic pump, and
a low-pressure accumulator which is arranged in a hydraulic connection between the wheel brake (6) and the hydraulic pump (8), the accumulator comprising
a housing bore,
an inlet hydraulically connected to the wheel brake,
an outlet hydraulically connected to the intake side of the pump, and
a media-separating element in the housing bore (3) including a diaphragm (2) made of an elastic material for the purpose of pressure fluid intake,
wherein the diaphragm (2) is acted upon indirectly by an accumulator spring (21), with a diaphragm plate (20) interposed, and wherein the diaphragm plate (20) has a concave design with respect to the pressure fluid inlet (4) and
wherein the diaphragm plate (20) is shaped liked a bowl with a bottom (22), with a wall (23), and with an edge (24), and wherein the accumulator spring (21) surrounds the wall (23) and abuts on the edge (24).

\* \* \* \* \*